(12) United States Patent
Musoll et al.

(10) Patent No.: US 12,542,646 B1
(45) Date of Patent: Feb. 3, 2026

(54) CONFIGURABLE-AGGREGATION RETIMER WITH LANE-DEDICATED CONTROLLERS

(71) Applicant: Astera Labs, Inc., Santa Clara, CA (US)

(72) Inventors: Enrique Musoll, San Jose, CA (US); Casey Morrison, San Jose, CA (US); Ken (Keqin) Han, Fremont, CA (US); Pulkit Khandelwal, Cupertino, CA (US); Subbarao Arumilli, Cupertino, CA (US)

(73) Assignee: Astera Labs, Inc., San Jose, CA (US)

( * ) Notice: Subject to any disclaimer, the term of this patent is extended or adjusted under 35 U.S.C. 154(b) by 0 days.

(21) Appl. No.: 18/653,533

(22) Filed: May 2, 2024

Related U.S. Application Data (63) Continuation of application No. 17/724,207, filed on Apr. 19, 2022, now Pat. No. 12,003,610, which is a continuation of application No. 17/227,272, filed on Apr. 10, 2021, now Pat. No. 11,424,905, and a continuation-in-part of application No. 17/026,454, filed on Sep. 21, 2020, now Pat. No. 11,327,913, said application No. 17/227,272 is a continuation-in-part of application No. 17/026,454, filed on Sep. 21, 2020, now Pat. No. 11,327,913.

(60) Provisional application No. 63/008,292, filed on Apr. 10, 2020, provisional application No. 62/903,054, filed on Sep. 20, 2019.

(51) Int. Cl.
*H04L 7/00* (2006.01)
*G06F 13/42* (2006.01)

(52) U.S. Cl.
CPC ........ *H04L 7/0041* (2013.01); *G06F 13/4291* (2013.01); *G06F 2213/0026* (2013.01)

(58) Field of Classification Search
CPC .................. H05L 7/0041; G06F 13/4291
USPC ......................................... 375/354
See application file for complete search history.

(56) References Cited

U.S. PATENT DOCUMENTS

| | | |
|---|---|---|
| 4,677,618 A | 6/1987 | Haas et al. |
| 4,984,236 A | 1/1991 | Chopping et al. |
| 5,404,374 A | 4/1995 | Mullins et al. |
| 5,592,519 A | 1/1997 | Honaker, Jr. |
| 5,920,897 A | 7/1999 | Jin et al. |
| 7,454,537 B1 | 11/2008 | Xue |
| 7,551,646 B1 | 6/2009 | Zhang et al. |
| 7,702,840 B1 | 4/2010 | Mccarthy et al. |
| 8,886,856 B1 | 11/2014 | Mendel |
| 9,337,993 B1 | 5/2016 | Lugthart et al. |
| 9,910,813 B1 | 3/2018 | Khan et al. |
| 10,146,722 B1 | 12/2018 | Brown et al. |

(Continued)

OTHER PUBLICATIONS

Intel Corporation (Samaan et al.), "High-Speed Serial Bus Repeater Primer—Re-driver and Re-timer Micro-architecture, Properties and Usage," Revision 1.2, Oct. 2015, 72 pages.

(Continued)

*Primary Examiner* — Paul R. Myers
(74) *Attorney, Agent, or Firm* — Charles Shemwell (57) ABSTRACT

Groups of signal conductors within a configurable communication system are managed by respective, dedicated media controllers implement a configurable number of independent communication channels through coordinated action so that signal conductors need not be multiplexed to/from multiple controllers and no media controllers or input/output driver circuits therein need be disabled in any configuration.

23 Claims, 7 Drawing Sheets

(56) References Cited

U.S. PATENT DOCUMENTS

| | | |
|---|---|---|
| 11,424,905 B1 | 8/2022 | Musoll et al. |
| 2004/0037202 A1 | 2/2004 | Brommer et al. |
| 2006/0023633 A1 | 2/2006 | Caruk et al. |
| 2007/0038789 A1 | 2/2007 | Macri et al. |
| 2007/0086551 A1 | 4/2007 | Wayner et al. |
| 2008/0056426 A1 | 3/2008 | Si et al. |
| 2008/0123638 A1 | 5/2008 | Liao |
| 2008/0240737 A1 | 10/2008 | Takahara |
| 2008/0304519 A1 | 12/2008 | Koenen et al. |
| 2009/0024900 A1 | 1/2009 | Wilkinson et al. |
| 2009/0323722 A1 | 12/2009 | Das Sharma |
| 2010/0020818 A1 | 1/2010 | Cardona et al. |
| 2010/0215086 A1 | 8/2010 | Vijayaraghavan et al. |
| 2010/0262767 A1 | 10/2010 | Borchers et al. |
| 2010/0329285 A1 | 12/2010 | Stanton et al. |
| 2012/0082463 A1 | 4/2012 | Kasprzyk |
| 2013/0336104 A1 | 12/2013 | Talla et al. |
| 2014/0185627 A1 | 7/2014 | Ditya |
| 2015/0067210 A1 | 3/2015 | Iyer et al. |
| 2015/0098538 A1 | 4/2015 | Wiley et al. |
| 2015/0103850 A1 | 4/2015 | Wang et al. |
| 2016/0094297 A1 | 3/2016 | Xie |
| 2017/0351640 A1 | 12/2017 | Nilange et al. |
| 2019/0258600 A1 | 8/2019 | Das Sharma |
| 2019/0273571 A1 | 9/2019 | Bordogna et al. |
| 2020/0228467 A1 | 7/2020 | Louzoun et al. |
| 2020/0280458 A1 | 9/2020 | Lam et al. |
| 2020/0358432 A1 | 11/2020 | Wysocki |

OTHER PUBLICATIONS

Intel Corporation, "PCI Express (PCIe) 4.0 Retimer Supplemental Features and Standard BGA Footprint, Revision 004," Jun. 2018, 53 pages.

PCI-SIG, "PCI Express Base Specification Revision 5.0 Version 1.0", May 22, 2019, 1299 pages.

FIG. 8
Per-Lane, Per-Flow-Direction Deskew FIFO

CONFIGURABLE-AGGREGATION RETIMER WITH LANE-DEDICATED CONTROLLERS

CROSS REFERENCE TO RELATED APPLICATIONS

This application is a continuation of U.S. application Ser. No. 17/724,207 filed Apr. 19, 2022, which is a continuation-in-part of U.S. application Ser. No. 17/026,454 filed Sep. 21, 2020 (U.S. Pat. No. 11,327,913), which claims the benefit of U.S. provisional application No. 62/903,054 filed Sep. 20, 2019. U.S. application Ser. No. 17/724,207 is also a continuation of U.S. application Ser. No. 17/227,272 filed Apr. 10, 2021 (U.S. Pat. No. 11,424,905), which claims the benefit of U.S. provisional application No. 63/008,292 filed Apr. 10, 2020, and also is a continuation in part of U.S. application Ser. No. 17/026,454 filed Sep. 21, 2020. Each of the above-identified patent applications is hereby incorporated by reference.

BACKGROUND

In Ethernet, Peripheral Component Interconnect Express (PCIe) and other modern communication systems, physical signaling media may be organized into a configurable number of independent communication channels. For example, a 16-lane PCIe system may be configured alternately as eight distinct communication channels each containing two signaling lanes (eight "x2 links" in PCIe parlance), or as four links each containing four lanes (four x4 links), two x8 links or a single x16 link. To manage lane-to-lane timing deskew and other complex time-critical interactions between constituent lanes of a channel or link, a dedicated "link controller" is provided for each distinct link so that, in the 16-lane PCIe example (i.e., configurable into eight x2 links, four x4 links, two x8 links or a single x16 link), as many as fifteen link controllers may be required—eight controllers for each of the eight x2 links, four controllers for each of the four x4 links, two controllers for each of the two x8 links, and one controller for the x16 link. While this controller count is typically reduced by enabling each of the controllers for lane aggregations greater than the minimum (i.e., controllers for links formed by more than two lanes and thus the x16, x8 and x4 controllers) to be configured for reduced-width operation (e.g., x16 controller can be configured for operation in x8 mode in which 50% of the lane inputs/outputs (I/Os) for that controller are unused, or for operation in x4 mode (75% I/Os unused) or x2 mode (87.5% IOs unused)), the constituent signaling conductors of individual lanes must still be multiplexed to and from each controller to enable the various configuration options. Thus, aside from the waste of redundant resources in all configuration modes (e.g., x2, x4 and x8 controllers unused in x16 mode, or unused I/Os within x16, x8 and/or x4 controllers in all other modes), the extensive signal multiplexing required to support the various configuration modes adds implementation and operational complexity—for example, degraded signal integrity due to wire fan-out to multiple multiplexer loads, timing skew due to non-uniform propagation distances from fan-out point to individual multiplexers, layout congestion resulting in increased chip area, etc.

BRIEF DESCRIPTION OF DRAWINGS

The various embodiments disclosed herein are illustrated by way of example, and not by way of limitation, in the figures of the accompanying drawings and in which like reference numerals refer to similar elements and in which.

DETAILED DESCRIPTION

In various embodiments herein individual signal conductors or groups of signal conductors within a configurable communication system are managed by respective, dedicated media controllers that support all possible channel-count configurations through coordinated action so that signal conductors need not be multiplexed to/from multiple controllers and no media controllers or controller I/Os need be disabled in any configuration. In a number of embodiments, the conductor-dedicated media controllers are implemented within a bidirectional reach extension device such as a retimer so that the resource savings—obviation of signal multiplexer circuitry and surplus controller I/O circuitry—are achieved in both the retimer ingress and egress paths for each signaling direction. To support configurations in which multiple per-controller sets of signaling conductors are aggregated to form a higher bandwidth (higher conductor count) signaling channel or link, an aggregation engine is provided to configure (program) the media controllers for coordinated action and, in some cases, to provide centralized timing for controller-state transition or other time-critical events. In other embodiments, clock signals recovered from serial data streams conveyed on individual signal conductors (or differential pairs of signal conductors) are selectively forwarded to conductor-dedicated media controllers according to channel-count configuration, with balanced clock propagation delay through the clock selection circuitry to ensure clock/data phase alignment for all configurations. These and other features and embodiments are described in greater detail below.

Figure 1:
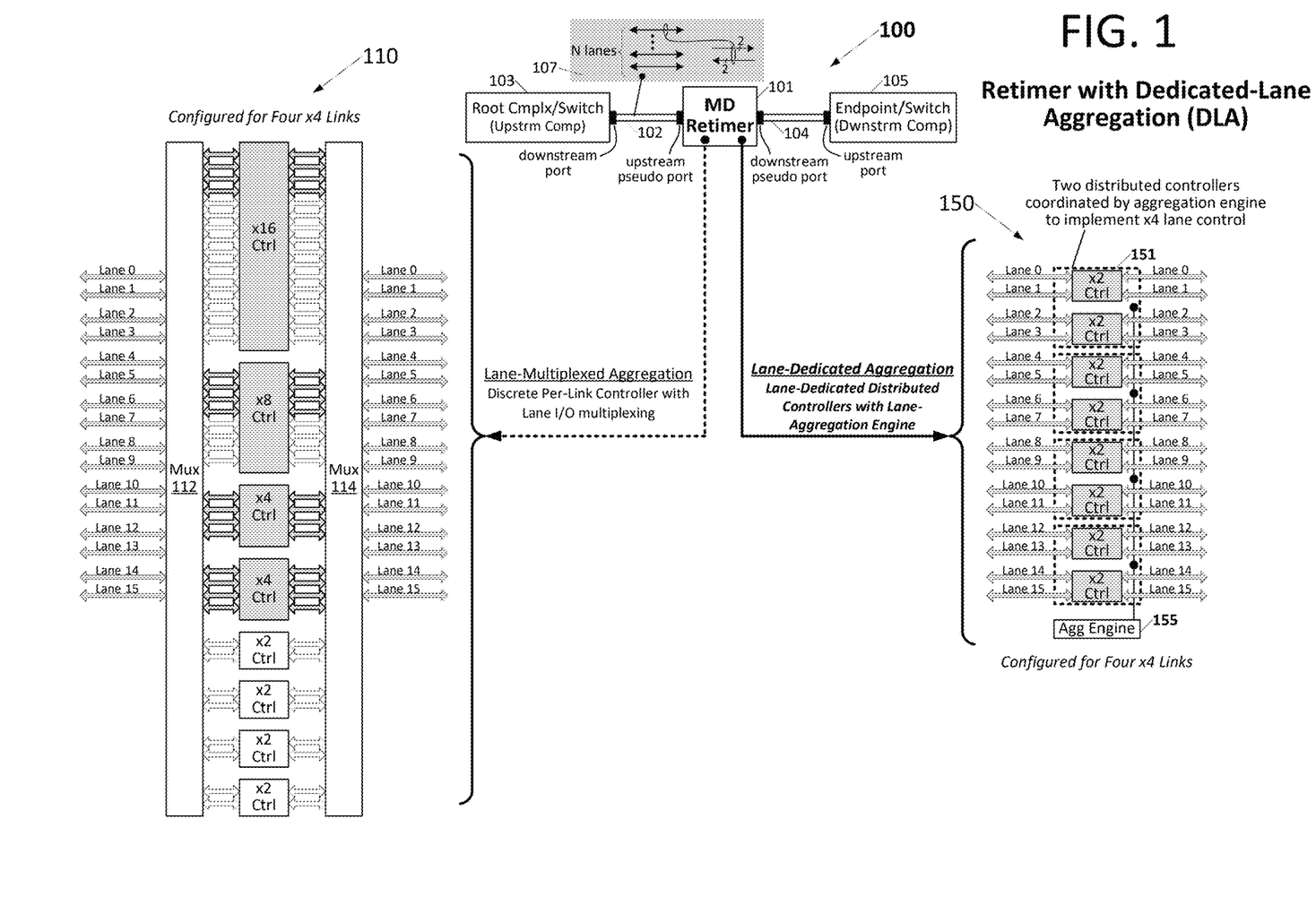
FIG. 1 illustrates an embodiment of a synchronous signaling system having a media-dedicated retimer coupled between upstream and downstream components via respective channel-count-configurable signaling paths.

FIG. 1 illustrates an embodiment of a synchronous signaling system 100 having a media-dedicated (MD) retimer 101 coupled between upstream and downstream components 103, 105, via respective channel-count-configurable signaling paths 102 and 104. Retimer 101 extends the viable signaling path length between the upstream and downstream components by applying timing information and digital data recovered from inbound symbol streams (sourced by either of components 103, 105 and destined for the other) to produce enhanced-integrity outbound symbol streams (with occasional content modification)—overall, permitting the upstream and downstream components to communicate reliably (e.g., meeting specified bit error rate) over otherwise impracticable distances.

For purposes of example and clarity of explanation, signaling paths 102, 104 and driver/receiver ports within retimer 101, upstream component 103, and downstream component 105 (i.e., downstream port of component 103, upstream port of component 105 and upstream/downstream pseudo ports of retimer 101, as shown) are assumed to implement a configurable number of communication channels in accordance with the Peripheral Component Interconnect Express (PCIe) communication specification and are thus described in the terminology of that specification. Accordingly, upstream component 103 may be a root complex or switch and the downstream component 105 may be an endpoint or switch, and the N bidirectional signaling "lanes" 107 that constitute the physical signaling media within each of paths 102 and 104 may be organized in a configurable number of communication channels between a given pair of components (i.e., upstream component and retimer or downstream component and retimer). For example, in a fully/maximally aggregated configuration, all N lanes (each implemented by a dedicated differential signaling pair for each signaling direction as shown at 107) are aggregated to form a single PCIe link with, for example, individual data blocks striped across the N lanes. Conversely, each of the N lanes may each be operated as a distinct and independent PCIe link (i.e., through which a serial stream of data blocks is conveyed) in a minimally aggregated or non-aggregated configuration, and in aggregation configurations between those two extremes, two or more PCIe links are implemented by respective lane aggregations (e.g., two links of N/2 lanes each; four links of N/4 lanes each, 8 links of N/8 lanes each, etc.).

Still referring to FIG. 1, the examples at 110 and 150 contrast a conventional lane-multiplexed aggregation with a dedicated-lane aggregation (DLA) approach in which eight lane-dedicated controllers are provided for respective pairs of 16 PCIe lanes. In the conventional approach at 110, a x16 controller ("x16 Ctrl") is provided to ensure support for maximum lane aggregation (16 lanes aggregated into one link-no segmentation), with that controller being coupled, via signal multiplexers 112 and 114, to 16 upstream PCIe lanes and 16 downstream PCIe lanes and configurable in x8, x4 and x2 aggregation/segmentation modes. When the x16 controller is configured for x8 aggregation, half of the controller inputs and outputs (I/Os, which appear on both sides of the controller in view of its deployment within a retimer) are unused and a x8 controller ("x8 Ctrl") is enabled to support the other of two x8 links. That is, signal multiplexers 112 and 114 route half of the upstream/downstream PCIe lanes to the x16 controller and the other half to the x8 controller. Similarly, when the x16 controller is configured for x4 aggregation (the example depicted in FIG. 1), 24 out of the x16 controller's 32 I/Os are unused, half of the x8 controller's 16 I/Os are unused, and two x4 controllers ("x4 Ctrl") are enabled. When configured for x2 aggregation—the minimum aggregation (maximum segmentation) in the FIG. 1 example—28 of the x16 controller's 32 I/Os are unused, 12 of the x8 controller's 16 I/Os are unused, 4 out of each x4 controller's 8 I/Os are unused and four x2 controllers ("x2 Ctrl") are enabled. Thus, aside from the complexity and signal integrity challenges of routing high-bandwidth signaling lanes (which, after deserialization may include, for example, 32 conductors per direction per lane (or more) and thus 1024 conductors on each side of the configurable controllers) through a signal multiplexer to as many as four different controllers (x16, x8, x4, x2), 60% of the total number of controller I/Os (as well as corresponding internal circuitry for those I/Os) are unused no matter the aggregation configuration.

In the lane-dedicated retimer architecture at 150, by contrast, no lane multiplexing is required on either side of the controller, dramatically simplifying the critical data path and avoiding the timing skew, latency penalty and signal degradation that plague point-to-multipoint multiplexing schemes. In the depicted embodiment, each of eight lane-dedicated controllers 151 is coupled to a respective, dedicated pair of PCIe lanes and thus naturally implement eight x2 PCIe links (minimum aggregation, maximum segmentation in this example). When lane aggregation greater than x2 is required, actions within individual lane-dedicated controllers 151 ("LD" controllers or "LDCs") are coordinated by an aggregation engine 155 to carry out time-critical inter-lane actions, including lane-to-lane timing deskew as discussed in greater detail below. In one embodiment, aggregation engine 155 additionally programs a configuration register within each of lane-dedicated controllers 151 to implement a desired aggregation (or segmentation)—for example, by programming a lane aggregation code (indicating, for example, full x16 lane aggregation into a single link, two x8 links, four x4 links or 8 x2 links) or by programming a lane mask that indicates, for each LD controller, the contribution of its dedicated lanes to a x2, x4, x8 or x16 link. In the depicted example, aggregation engine 155 (or other control circuitry) has programed each of LD controllers 151 for operation in a x4 aggregation and thus four PCIe links in which each neighboring pair of LD controllers is coordinated to effectuate x4 link control.

Figure 2:
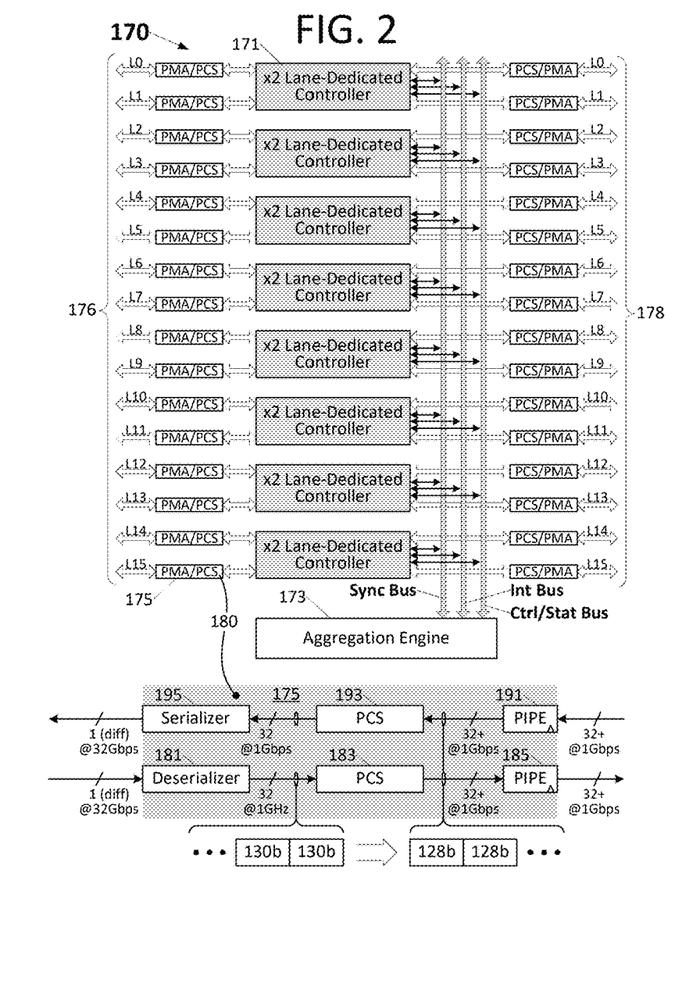
FIG. 2 illustrates a more detailed embodiment of a retimer having lane-dedicated controllers and an aggregation engine, together with physical media attachment and physical coding sublayer blocks for each lane on both upstream and downstream pseudo ports.

FIG. 2 illustrates a more detailed embodiment of a retimer 170 having lane-dedicated controllers 171 and aggregation engine 173, together with physical media attachment (PMA) and physical coding sublayer (PCS) blocks 175 for each lane on both upstream and downstream pseudo ports (176, 178). As shown for example in detail view 180, each PMA/PCS block 175 includes an input deserializer 181 that converts a 32 Gbps (32 gigabits per second) serial data stream received via a differential signaling pair into a 1 GHz stream of 32-bit wide data words, outputting that 1 GHz stream to PCS 183 which, in turn, reverses a 128*b*/130*b* encoding to produce a stream of 128 bit blocks (e.g., output in four successive sets of 32 bits at 1-nanosecond unit intervals). An interface 185 implemented by a set of data input/output registers and related circuitry according to a PIPE (Physical Interface for PCI Express) specification, registers the decoded data stream at the input of the corresponding LD controller.

Though not specifically shown, the PMA/PCS may also perform clock recovery (i.e., synthesizing a clock based transitions in the incoming data stream on each lane) and produce framing signals (i.e., marking the boundary of each 128-bit "data block" or "ordered set" block) and others, outputting the recovered clock, block-framing signal and others for consumption by the LD controller via PIPE interface 185. Also, as discussed below, in a number of embodiments, a clock selection circuit is provided to select, in accordance with the lane aggregation configuration, one or more operating clocks from among the multiple clocks recovered from constituent PCIe lanes of a given link—the one or more operating clocks to be applied within the LD controllers and transmit path within the downstream PCS/PMA blocks.

Still referring to the PMA/PCS example at 180, an outbound PIPE interface 191, PCS 193 and serializer 195 perform essentially reverse operations to those of the input signal path (i.e., registering signals from the LD controller, 128*b*/130*b*-encoding the 128-bit block stream to produce an outbound 130-bit block stream and then serializing the 32-bit-wide 1 GHz encoded block stream for 32 Gbps transmission on the outbound differential pair of the subject PCIe lane. In one embodiment, the aforementioned data-recovered clock (and/or derivations or subdivisions thereof) is applied within the deserializer, 130*b*-to-128*b* PCS and output PIPE, while a clock recovered from a corresponding downstream PCS/PMA block is applied within the input PIPE, 128*b*/130*b* PCS and serializer—an approach that avoids the complexity and latency penalty of a plesiochronous clock domain crossing in a given data flow direction. Other clocking architectures may be used in alternative embodiments.

In the FIG. 2 embodiment and those presented below, aggregation engine 173 communicates with each of the lane-dedicated controllers 171 (each of which is dedicated to two lanes in the depicted example—there may be more or fewer dedicated lanes per controller in alternative embodiments) via a set of controller-shared buses that include a high-speed synchronization bus ("Sync Bus"), somewhat lower speed interrupt bus ("Int Bus") and even lower speed control/status bus ("Ctrl/Stat Bus"). The aggregation engine may additionally communicate with the upstream and downstream PMA/PCS blocks, for example, to trigger reset and/or calibration operations, control block framing, etc.

Figures 3, 4:
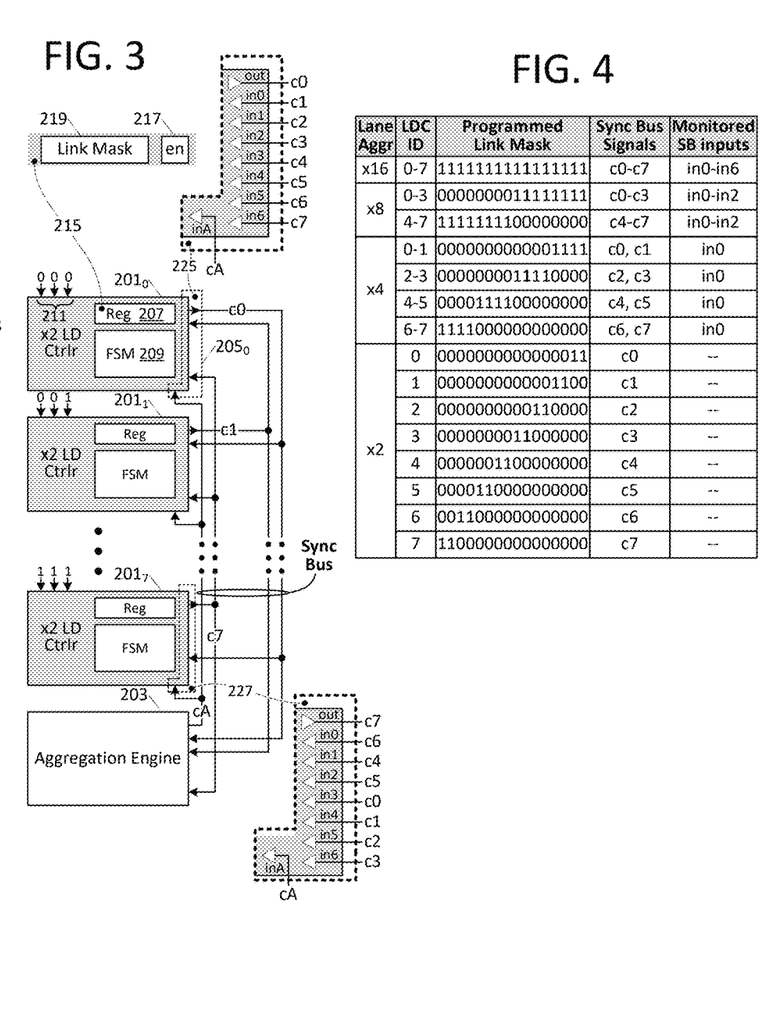
FIG. 3 illustrates a more detailed embodiment of a synchronization bus and its interconnection between a set of lane-dedicated controllers and an aggregation engine.
FIG. 4 illustrates exemplary link mask programming for each of four different aggregation (or segmentation) configurations.

FIG. 3 illustrates a more detailed embodiment of a synchronization bus and its interconnection between a set of lane-dedicated controllers 201₀-201₇ (collectively and interchangeably "201") and aggregation engine 203. In the example shown, the aggregation engine and each of the N=8 LD controllers 201 drives a respective, dedicated one of N+1 sync bus lines and listens to (i.e., receives) signals conveyed on the other N sync bus lines—that is, each of the N+1 sync bus lines is coupled to N+1 functional circuit blocks (aggregation engine+N LD controllers) and driven by a dedicated one of those functional blocks and monitored by the other N functional blocks. In alternative embodiments (and particularly where the number of LD controllers (N) exceeds practicable sync-bus-line fan out), two or more sync bus lines may be provided to convey the same sync bus signals to different subsets of the functional units (e.g., aggregation engine drives two identical sync bus signals on lines coupled to respective subsets of the LD controllers).

In the FIG. 3 embodiment, each LD controller 201 includes a sync bus interface (e.g., as shown at 205₀), programmable configuration register 207, finite state machine 209 (or sequencer or other control circuitry), and identifier (ID) interface 211. As shown, individual inputs of the ID interface are strapped/soldered or otherwise connected to logic high and low reference voltages (e.g., VDD and ground in a complementary metal oxide semiconductor (CMOS) implementation) to set a unique identifier per LD controller-a respective one of the values between 0 and 7 in this N=8 example (i.e., '000b', '001b', '010b', . . . , '110b', '111b', where 'b' signifies a binary value). The ID strapping enables aggregation engine 203 or other control circuitry to selectively/exclusively address an individual one of the LD controllers and thereby program the configuration register within each LD controller with a potentially unique value. In an exemplary implementation shown at 215, the programmable configuration register 207 within each LD controller includes an enable field 217 (e.g., used to selectively disable one or more of the LD controllers when not needed in a given system configuration or under certain operating conditions) and a link mask field 219, the latter to be programmed with a link mask value that indicates an aggregation setting for each of the LD controllers and thus which of possibly multiple links to which a given LD controller and its dedicated lanes are allocated.

FIG. 4 illustrates exemplary link mask programming for each of four different aggregation (or segmentation) configurations: single x16 link, two x8 links, four x4 links or eight x2 links. In the example shown, the link mask value includes 16 bits-one for each of 16 lanes—that are individually set to 1 or 0 to indicate whether a corresponding one of 16 PCIe lanes is included within the PCIe link to which the host LD controller is committed. Thus, in the x16 aggregation (all lanes committed/allocated to a solitary link-no segmentation), all bits of the link mask are programmed to '1' for each of the eight LD controllers (LDC ID=0-7). In this configuration, each of the LD controllers monitors the sync bus outputs from all other LD controllers to carry out time-critical operations-most notably lane-to-lane deskew as discussed below. More specifically, referring to the exemplary sync bus interfaces shown in detail views 225 and 227 (for LD controllers 201₀ and 201₇, respectively), each LD controller 201 monitors sync bus inputs in0-in6 (i.e., inputs from the other 7 LD controllers) as well as the sync bus input (inA) from aggregation engine 203. When configured for two x8 links, half of the LD controllers (e.g., controllers 0-3) and their corresponding PCIe lanes are allocated to a first x8 link (i.e., via link-mask programming of value '0000000011111111') and the other half of the LD controllers (i.e., controllers 4-7) and their corresponding lanes are allocated to a second x8 link (link-mask programmed to '1111111100000000') and, in the exemplary sync bus wiring of FIG. 3, all LD controllers monitor the first three sync bus inputs (in0-in2) and ignore/disable the sync bus inputs from other LD controllers (i.e., LD controllers 0-3 drive respective outputs coupled to one of the in0-in2 inputs of each counterpart controller within that set of four). In the four x4 aggregation setting, each respective pair of LD controllers (i.e., 0/1, 2/3, 4/5, 6/7) and their corresponding PCIe lanes are allocated to one of four x4 PCIe links through programming of link masks to '0000000000001111' (LD controllers 0 and 1), '0000000011110000' (LD controllers 2 and 3), '0000111100000000' (LD controllers 4 and 5) and '1111000000000000' (LD controllers 6 and 7). In this four-link (each with 4 lanes) aggregation configuration and with the sync bus wiring per the FIG. 3 example, each of the LD controllers monitors the sync bus input from its paired counterpart via in0 and ignores the inputs from all other LD controllers. In the eight x2 aggregation setting (8 PCIe links with two lanes each), each of the LD controllers is programmed with a link mask corresponding to its dedicated lane pair (i.e., '0000000000000011' for LD controller 0, '0000000000001100' for LD controller 1, . . . , '1100000000000000' for LD controller 7) and, as there is no aggregations of lanes dedicated to different controllers, ignores the sync bus inputs from all other LD controllers.

Though not specifically shown in FIG. 4, various alternative aggregation configurations may be programmed via the link mask (with corresponding difference in monitored SB inputs), including configurations in which non-uniform numbers of lanes are allocated/committed to respective PCIe links (e.g., one x8 link, two x4 links; one x4 link, six x2 links, etc.), and/or configurations in which lanes dedicated to non-adjacent/non-neighboring LD controllers are aggregated (e.g., x4 link formed by aggregation of lanes dedicated to controller 0 with lanes dedicated to controller 2), the latter providing aggregation options during testing or upon failure of one or more LD controllers. Also, while a 16-bit link mask is shown for clarity, the mask may be reduced to an N/M-bit mask (where N is the number of lanes and M is the number of lanes per LD controller) and thus an eight-bit link mask in the N=16 lane, M=2-lane-per-controller example carried forward from FIG. 1 (i.e., each of the eight bits indicating the allocation of a controller's two dedicated lanes to a given link). Further, the correspondence between a given LD controller and the lane(s) to which it is dedicated may be implicit (rather than explicitly represented) in the link mask so that one or more bits shown for a controller's dedicated lanes may be omitted from the link mask (e.g., 14-bit link mask in which LD controller implies two '1' bits at a position within the link mask corresponding to its ID). In yet other embodiments, the link mask may be replaced by an encoded aggregation setting (e.g., two bits to indicate one of the following four aggregation settings: x16, x8, x4, x2) in which the lanes dedicated to a given controller are impliedly included within a link according to the aggregation setting (e.g., in x8 configuration each LD controller monitors sync bus inputs in0-in2; in x4 configuration, each LD controller monitors sync bus input in0).

Figure 5:
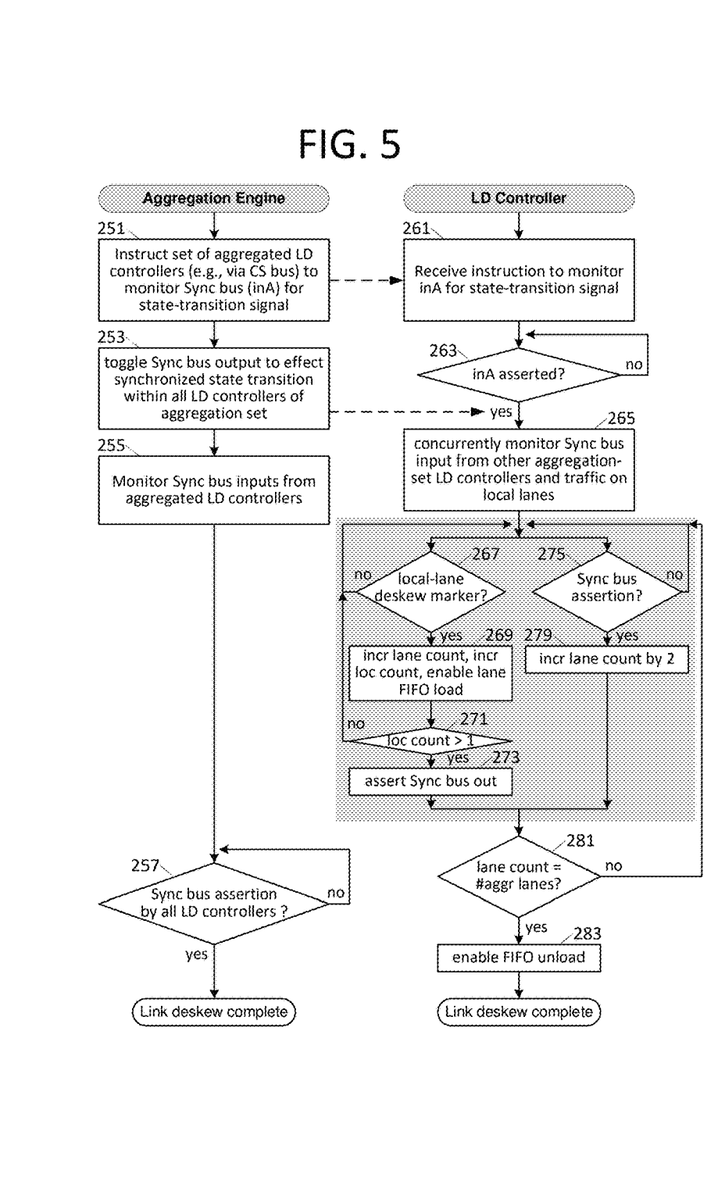
FIG. 5 illustrates exemplary coordination between an aggregation engine and lane-dedicated controllers to remove timing skew between symbol streams flowing on respective lanes of a link—an inter-lane deskew operation to align incoming symbol streams on a block boundary.

FIG. 5 illustrates exemplary coordination between an aggregation engine and lane-dedicated controllers (e.g., implemented according to embodiments discussed above) to remove timing skew between symbol streams flowing on respective lanes of a link—an inter-lane deskew operation to align incoming symbol streams on a block boundary (e.g., an ordered-set boundary). Because lane-to-lane misalignment at the PIPE interface (i.e., as shown at FIG. 2) may be as small as a bit time (symbol time or unit interval), time-critical operations that require same-clock-cycle (e.g., clock-edge-synchronized) action by two or more LD controllers are coordinated via the synchronization bus, while less time sensitive actions are coordinated via the control/status bus and/or interrupt bus. Thus, in the FIG. 5 embodiment, aggregation engine commences an inter-lane deskew within an aggregated set of LD controllers (i.e., controllers for lanes configurably aggregated into a single PCIe link) at 251 by instructing those controllers via the control/status bus (or interrupt bus) to begin monitoring their respective aggregation-engine inputs (inA as shown in controller sync bus interfaces 225 and 227 of FIG. 3) for a state-transition signal. The LD controllers receive the aggregation-engine instruction at 261 and begin monitoring their inA inputs for the state-transition signal (e.g., change in logic level at the inA input from high to low or low to high), looping at 263 until detected. In one embodiment, the longest flight time (worst case propagation delay from source to destination) across any line of the sync bus is less than a clock cycle or unit interval (e.g., less than shortest data-valid interval on individual lanes of the link) so that, when the aggregation engine toggles its sync bus output at 253 (driving cA from low to high or high to low), all LD controllers simultaneously (within a unit interval) transition to a deskew-marker search state (i.e., affirmative determination at 263).

In the inter-lane deskew strategy of FIG. 5, individual LD controllers monitor traffic on their dedicated lanes for deskew markers—for example, a skip ordered set (SKPOS) conveyed in the incoming block stream—and buffer the stream of symbols propagating on each lane from the point of deskew marker detection (on that lane) until deskew markers have been detected on all lanes of the aggregation set. This marker-triggered data buffering effectively sets a first-in-first-out (FIFO) buffer depth for each lane according to the degree by which traffic on that lane leads traffic on the slowest (last-marker-found) lane so that, upon last-marker detection, the LD controllers may enable through-FIFO data flow to align the symbol streams on all lanes of the link on the same block boundary. Accordingly, upon transitioning to the deskew-marker search state, each LD controller concurrently monitors both the Sync bus inputs from other LD controllers in the same aggregation set and the symbol stream on the controller's dedicated lanes for respective deskew markers (i.e., as shown at 265), maintaining a tally of the total number of lanes of the link for which deskew markers have been found (lane count) and a tally of the number of the controller's dedicated lanes for which markers have been found (local count). Each LD controller responds to detection of a deskew marker on a local lane (affirmative determination at 267) by incrementing both the local count and the lane count, and also enabling FIFO buffer loading for the subject lane as shown at 269. If the local count indicates that deskew markers have been detected on all local lanes—that is, local count >1 (affirmative decision at 271) in the two-lanes-per-controller example presented above—the LD controller asserts its sync bus output at 273 to notify other LD controller(s) within the aggregated set of the completed local marker detection. When an LD controller detects a sync bus assertion at one of its monitored Sync bus inputs at 275 (i.e., all or a subset or none of the sync bus inputs in accordance with aggregation configuration as show, for example, in FIG. 5), the LD controller increments the lane count by two (279) to reflect the detection of deskew markers on the two lanes dedicated to the sync-bus-asserting controller (more generally to increment by M at 279 according to the number of lanes dedicated to the signal-asserting LD controller). After asserting the sync bus output at 273 or incrementing the lane count at 279, the LD controller determines whether deskew markers have been detected for all lanes of the aggregated set (e.g., by comparing the lane count to the number of lanes within the aggregation set configuration as shown at 281). If deskew markers have not been found for all lanes of the aggregated set, operational flow continues at monitoring operations 267 and 275 (or at least one of those two monitoring operations according to lane count value). If the determination at 281 is affirmative, then the deskew marker has been detected for the most latent lane (as well as all others) and FIFO flow-through is enabled at 281 (e.g., by enabling the FIFO buffer for each lane, if loaded at all, to henceforth be unloaded as new data is loaded) to conclude the deskew operation.

Still referring to FIG. 5, the aggregation engine monitors sync bus inputs from aggregated LD controllers until all LD controllers within the aggregated set have asserted their sync bus outputs (i.e., monitoring at 255, looping until all markers found at 257). At this point, the aggregation engine deems the link deskew to be complete and may signal an imminent state change and/or other information to the LD controllers (e.g., via control/status bus or interrupt bus) to make ready for other link management operations and/or live traffic flow.

Figure 6:
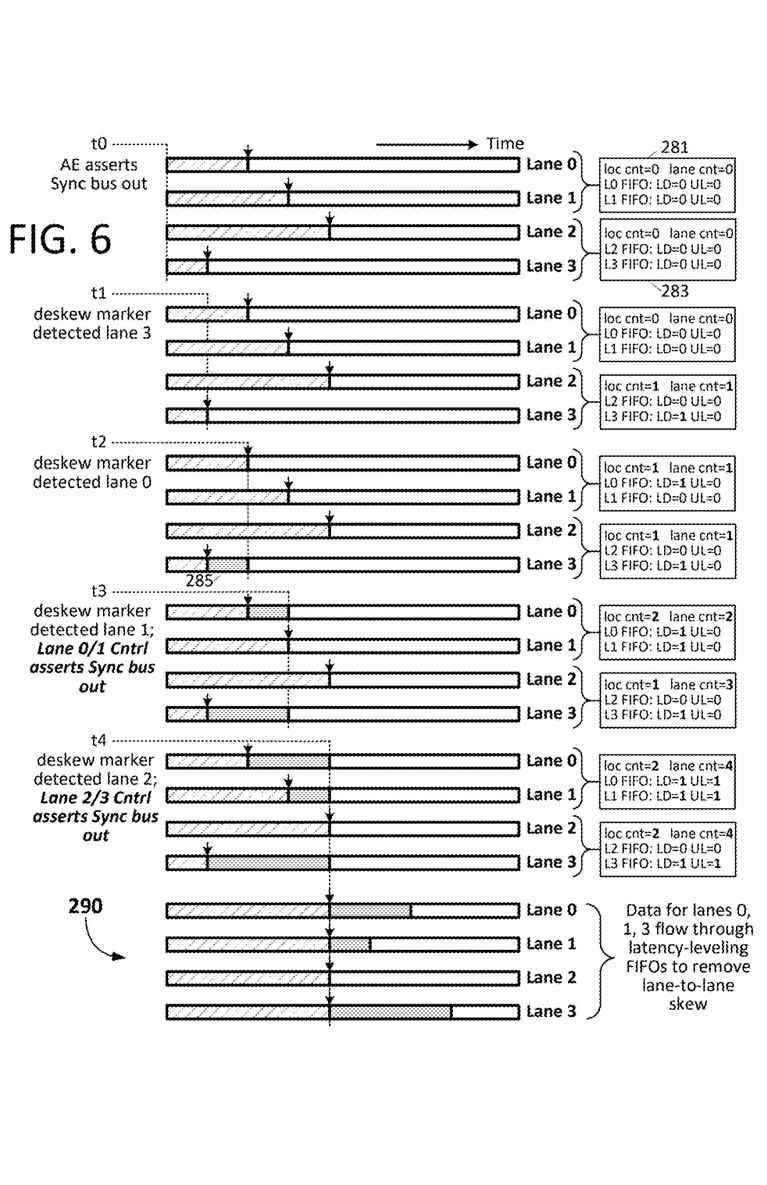
FIG. 6 illustrates a lane deskew operation within a four lane link controlled by two lane-dedicated controllers.

FIG. 6 illustrates a lane deskew operation within a four lane link controlled by two LD controllers (each controller being dedicated to a respective pair of lanes within the 4-lane link), showing traffic that precedes and succeeds the deskew marker on a given lane with and without hashing, respectively. The status of the local counter, lane counter, and per-lane FIFOs maintained by the two LD controllers is shown at 281 and 283, respectively, and progressively updated (repeating the lanes and status information downward across the drawing) as events occur in succession at times t0-t4.

At time t0, the aggregation engine asserts its Sync bus output (i.e., signal cA in FIG. 3) to transition the two LD controllers simultaneously into the deskew-marker search state. At this point (or in response to transitioning to the deskew-marker search state), each LD controller zeroes its local count and lane count values, and disables FIFO load and unload (LD=0, UL=0) for each of its two dedicated lanes. At time t1, the LD controller for lanes 2/3 detects a deskew marker on lane 3 and responsively (i) increments the local count and lane count, and (ii) enables FIFO loading for lane 3 (LD=1). At t2, the lane 0/1 LD controller detects a deskew marker on lane 1 and thus increments the local count and lane count and enables lane 0 FIFO loading (LD=1 for lane L0). Note also that the data stream arriving on lane 3 between times t1 and t2 has been loaded into the lane 3 FIFO as marked by the shading at 285—the loaded data remains resident within the FIFO (is not unloaded or otherwise output) at this point and will continue to accumulate, setting a fill depth of the lane 3 FIFO according to the skew between lane 3 and the slowest (most latent) lane-lane 2 in this example. At t3 (after the lane 3 FIFO has filled further and the lane 0 FIFO has begun to fill), the lane 0/1 LD controller detects a deskew marker on lane 2 and thus increments the local count and lane count—in this case asserting the sync bus output to signify that deskew markers have been detected on all (both) lanes dedicated to the lane 0/1 LD controller. The lane 2/3 LD controller responds to the sync bus signal assertion (e.g., detected at in0 in the FIG. 4 sync bus interface example) by incrementing its lane count by two. At t4, after the FIFOs for lanes 0, 1 and 2 have been filled to varying degrees (according to their respective deskew-marker displacements from that of the slowest lane), the lane 2/3 controller detects a deskew marker on lane 2 and responsively (i) increments the local count and lane count (to 2 and 4, respectively), and (ii) asserts its sync bus output in view of the completed local-lane marker detection. The lane 0/1 controller increments its lane count from 2 to 4 in response to the sync bus signal assertion (i.e., by the lane 2/3 controller) so that both LD controllers have lane counts that match the lane aggregation count and thus transition the now-loaded FIFOs for lanes 0, 1 and 3 to a flow-through state (e.g., by enabling those FIFOs to be both loaded (LD=1) and unloaded (UL=1) during each succeeding unit interval. The effect of the FIFO flow-through is shown at 290—effectively moving the buffered data for lanes 0, 1 and 3 ahead of incoming traffic (which will continue to be loaded into and thus flow through the lane FIFO) so that the deskew markers for all aggregated lanes are aligned—the desired and deskewed timing alignment for the link.

Figure 7:
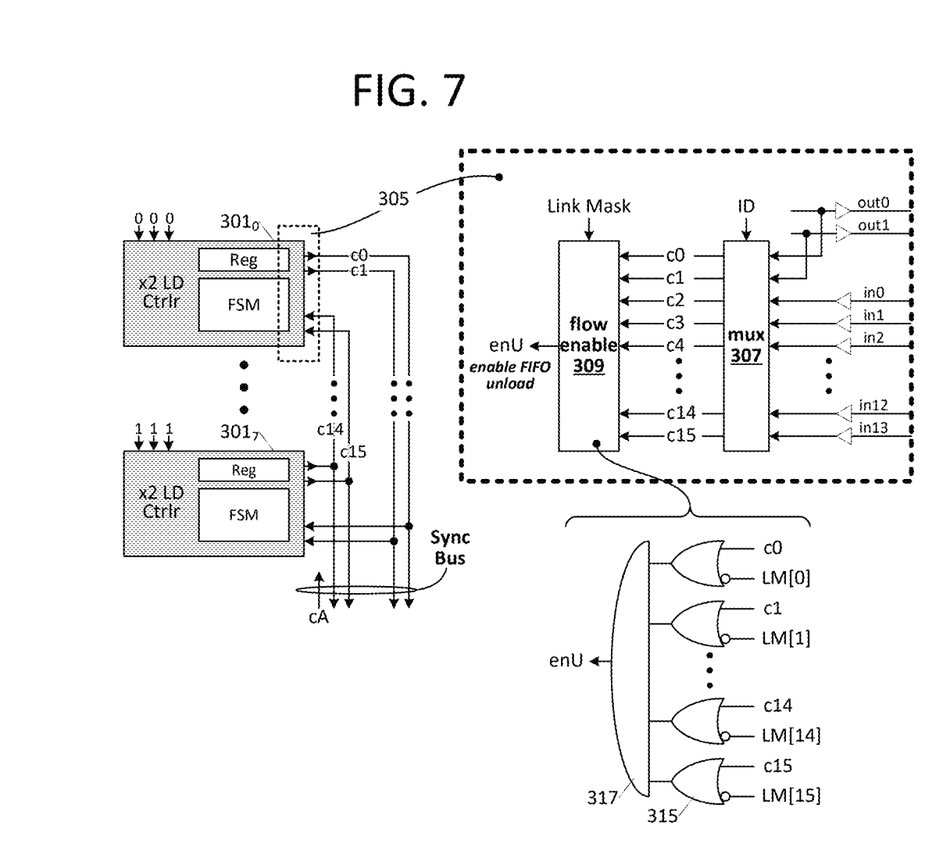
FIG. 7 illustrates an alternative lane-dedicated controller/synchronization-bus implementation in which each controller drives a respective sync-bus signal per dedicated lane.

FIG. 7 illustrates an alternative LD-controller/Sync-bus implementation in which each LD controller $301_0$-$301_7$ drives a respective sync-bus signal per dedicated lane (two sync-bus outputs per LD controller 301 in the depicted x2 controller example) so that the sync bus includes one signal line per PCIe lane plus at least one signal line driven by the aggregation engine (i.e., signal cA) and thus 17 signal lines in the 16-lane example shown. As shown in the exemplary sync-bus interface and internal LD controller logic (e.g., within FSM) at 305, each LD controller asserts a respective "marker-detect" signal on either output line out0 or out1 in response to detecting a deskew marker on the corresponding dedicated lane (asserting both out0 and out1 when markers have been detected on both lanes). The sync bus outputs of each LD controller are coupled to the sync bus inputs of all other controllers so that, in addition to asserting marker-detect status for each of its own lanes, each controller receives fourteen sync bus signals corresponding to the fourteen lanes managed by the other LD controllers. As shown, the sixteen marker-detect signals (the fourteen incoming and the two self-generated) are supplied to a multiplexer 307 which organizes the signals according to the LD controller ID to yield ID-aligned marker-detect signals c0-c15 at the multiplexer output, with each of those signals corresponding to the like-numbered PCIe lane. As an example, within the LD controller for lanes 0 and 1 (i.e., controller $301_0$), c0 and c1 are driven by the internally generated marker-detect signals, while c2 and c3 are driven by the marker-detect signals from the lane 2/3 controller, c4 and c5 are driven by the marker-detect signals from the lane 4/5 controller and so forth. By contrast, in LD controller $301_7$ (i.e., the controller for lanes 14 and 15), c14 and c15 are driven by the internally generated marker-detect signals, while c0 and c1 are driven by the marker-detect signals from the lane 0/1 controller, c2 and c3 are driven by the marker-detect signals from the lane 2/3 controller, and so forth.

Still referring to detail view 305 (FIG. 7), flow enable logic 309 enables FIFO flow-through operation (i.e., by asserting enable-unload signal, enU) in response to assertion of all marker-detect signals for a given link aggregation (i.e., the link aggregation that includes the lanes managed by the host LD controller). In the depicted embodiment, for instance, signals c0-c15 are ORed with the complements of link mask bits (i.e., LM[0]-LM[15]) within respective OR gates 315 to produce a masked-set of marker-detect signals at the inputs of AND gate 317 (so that the masked marker-detect signals for lanes not included in the aggregation are always high and thus ignored) which, in turn, asserts the FIFO unload signal (enU) as soon as all marker-detect signals for the aggregated lanes have been found. Overall, the signal multiplexer 307 structure and flow enable logic 309 impose a mere handful gate delays (picoseconds each) between sync-bus interface and output of AND gate 317 so that the enable-unload signal is asserted immediately after assertion of the final marker-detect signal for a given lane aggregation (i.e., final deskew marker found), thus enabling transition from FIFO load/bypass status to FIFO flow-through without interrupting or delaying the data flow path on the most latent link (i.e., avoiding any latency penalty that may be incurred in the counting and decision-making operations of the FIG. 5/6 embodiments). Latency may be further reduced in alternative embodiments by omitting multiplexer 307 and providing, instead, a respective sync-bus line (and sync-bus signal receiver) for each of the marker-detect signals. In a modification of the FIG. 7 implementation, for instance, each LD controller 301 includes 16 inputs to receive respective sync-bus signals c0-c15 (i.e., each LD controller both outputs and receives the marker-detect signals for the lanes to which it is dedicated) via sync-bus lines dedicated to respective lanes. That is, the sync-bus line conveying c0 is coupled to a "c0 input" within each of the LD controllers, the c1 sync-bus line is coupled to the c1 input within each LD controller, and so forth, so that, within a given LD controller, no multiplexing is required between the sync-bus inputs and flow-enable circuit 309.

Figure 8:
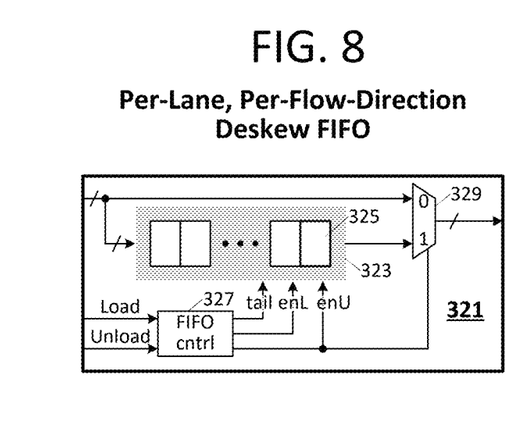
FIG. 8 illustrates an embodiment of a deskew FIFO (first-in-first-out) circuit that may be deployed within individual lane-dedicated controllers to enable inter-lane deskew operations.

FIG. 8 illustrates an embodiment of a deskew FIFO circuit 321 that may be deployed within individual LD controllers to enable the above-described deskew operations—that is, one deskew FIFO 321 for each flow direction for each lane and thus four deskew FIFOs per LD controller in a retimer having a respective controller per pair of lanes. As shown, deskew FIFO 321 includes a first-in-first-out storage 323 (with each constituent storage element 325 being, for example, 32 bits wide to accommodate deserialized data symbols), a FIFO controller 327 that issues control signals to FIFO storage 323 in response to load and unload signals from the host LD controller, and a path multiplexer 329 to route either the FIFO storage output or the incoming symbol stream to downstream circuitry. In the embodiment shown, FIFO storage 323 is operated as a shift register with a configurable load point established by a tail pointer ("tail") output from FIFO controller 327. In one embodiment, FIFO controller 327 initially points the tail pointer to the head element of the FIFO storage (e.g., rightmost one of elements 305) and responds to a "Load" signal assertion by (i) asserting a load-enable signal (enL) to enable incoming traffic (e.g., a 32-bit data word) to be clocked into the FIFO storage element selected by the tail pointer and (ii) advance the tail pointer to select (point to) the preceding storage element within the FIFO. Through this operation, the FIFO depth (i.e., amount of data loaded into storage elements between FIFO head and tail) is progressively increased as constituent storage elements 325 are successively loaded with inbound data. The enable-unload (enU) output from FIFO controller 327 remains deasserted at this point so that no data is evicted from the FIFO storage 323 and the path multiplexer 329 forwards the incoming traffic stream to the FIFO circuit output. When the host LD controller asserts the FIFO unload signal ("Unload") to establish FIFO flow-through operation, FIFO controller 327 asserts the enable-unload signal to enable content at the head of FIFO storage 323 to be output from the FIFO circuit via path multiplexer 329 and to shift the remaining contents of FIFO storage 323 forward from tail-pointer location to FIFO head. During the flow-through operation (unload asserted), FIFO controller 327 holds the tail pointer steady (i.e., does not adjust the tail pointer) so that the FIFO fill depth remains unchanged as data is shifted through the FIFO and thus adds latency (for the purpose of inter-lane deskew) to the outbound data stream according to the FIFO depth. As discussed below, FIFO circuit 321 may include circuitry to freeze the circuit output during FIFO fill (i.e., loading the FIFO storage, but not yet unloading) and may be implemented with alternative control and/or storage circuitry. For example, instead of operating FIFO storage elements 325 as a shift register, FIFO storage 323 may be implemented by a ring buffer for which the FIFO controller 327 manages head and tail pointers to enable FIFO load and flow-through operation-advancing the head and tail pointers during FIFO flow through rather than shifting data between storage elements 325.

Figure 9:
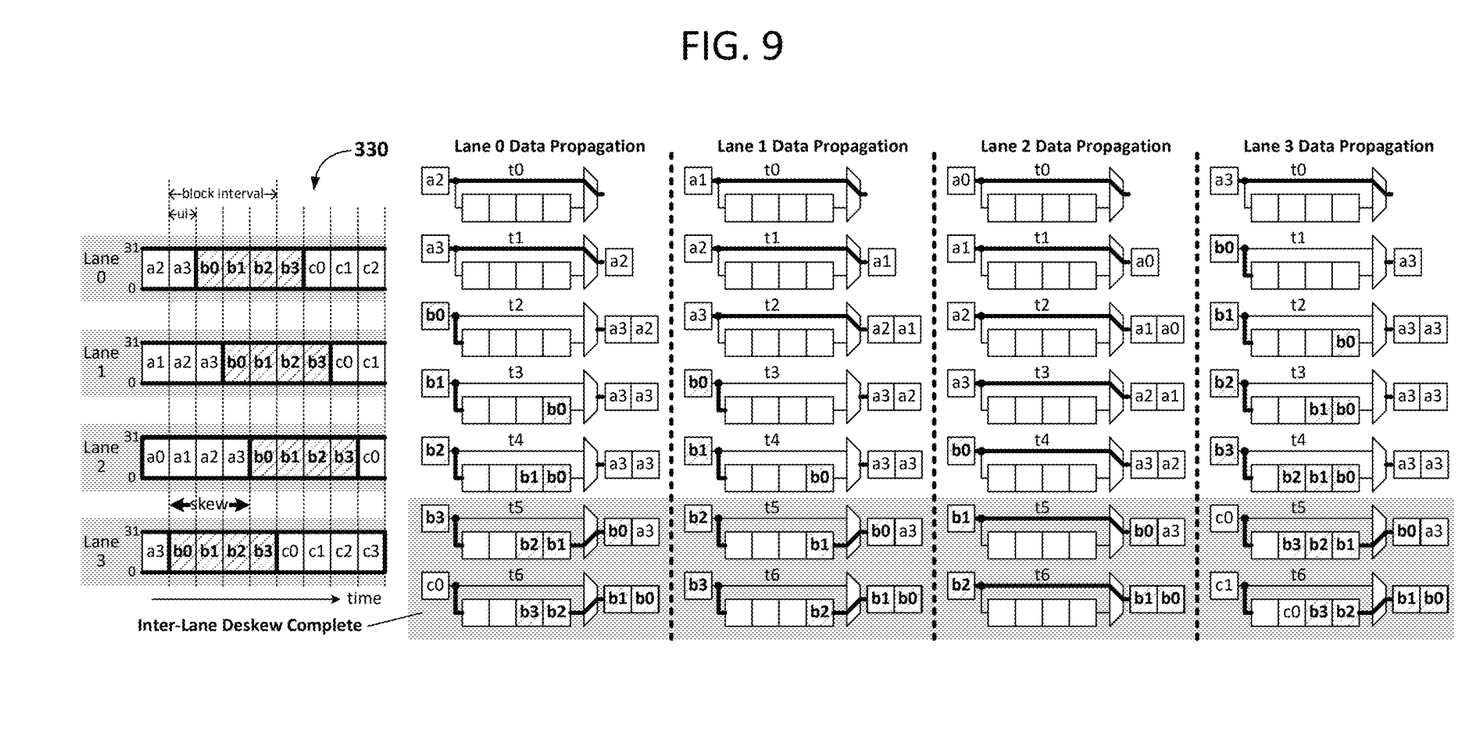
FIG. 9 illustrates an exemplary data progression with respect to deskew FIFOs for each of four lanes of an aggregated link.

FIG. 9 illustrates an exemplary data progression from time t0 to time t6 with respect to deskew FIFOs for each of four lanes (for one flow direction) within a x4 aggregated link. Assuming the data pattern shown at 330 for the four lanes (i.e., in which the shaded blocks containing values b0-b3 constitute a SKP ordered set and thus a deskew marker, and in which like references 'a1', 'a2', ... 'c0', etc. within the traffic for different lanes indicate values that, but for inter-lane skew, would be unit-interval-aligned), traffic flows past the FIFO for each lane until the SKP ordered set is detected. Upon SKPOS detection within a given lane, FIFO load commences and continues for that lane until the final SKP ordered set is detected (in lane 2 in this example). Thus, loading into the lane 3 FIFO commences at time t2 (after SKPOS detection at time t1), loading into the lane 0 FIFO commences at time t3 and loading into the lane 1 FIFO commences at time t4. After the final SKPOS detection in lane 2 at time t4, FIFO unload and thus FIFO flow-through is enabled for all data buffering lanes (0, 1 and 3 in this example) so that the SKPOS is forwarded to downstream circuitry simultaneously on all four lanes (i.e., starting with data word b0 in this example), thus rendering a deskewed link output from time t5 forward.

In the FIG. 9 embodiment, commencement of FIFO loading (without unloading) for a given lane results in repetition of a given data word in the output stream until FIFO unloading is enabled (e.g., as can be seen for repetition of 'a3' at the output of the lane 0 FIFO structure at times t3 and t4), effectively idling the data stream for that lane while buffering and awaiting the deskew marker for the most latent lane. In one implementation, the FIFO controller (e.g., element 327 of FIG. 8) outputs a hold signal to downstream circuitry (e.g., register within the data flow path) for the subject lane to suspend data-word forwarding. In an alternative embodiment (e.g., as may be applied in next-generation PCIe and/or other signaling systems in which physical signal media may be configurably aggregated), the data word at the head of the FIFO storage is output repeatedly to effect the hold (i.e., so that, for example, 'b0' would be repeated instead of 'a3' at the FIFO mux output as shown for lane 0 at times t3 and t4). Also, while the FIFO multiplexer (e.g., corresponding to multiplexer 329 of FIG. 8) for the most latent lane (lane 2 in the FIG. 9 example) is shown as unchanged at time t5 (contrast the FIFO multiplexer switch for all data-buffering lanes), the FIFO multiplexer may be switched also for that lane upon detection of the final deskew marker, with management of the FIFO storage (i.e., by the FIFO controller 327 of FIG. 8) effecting FIFO storage bypass.

Figure 10:
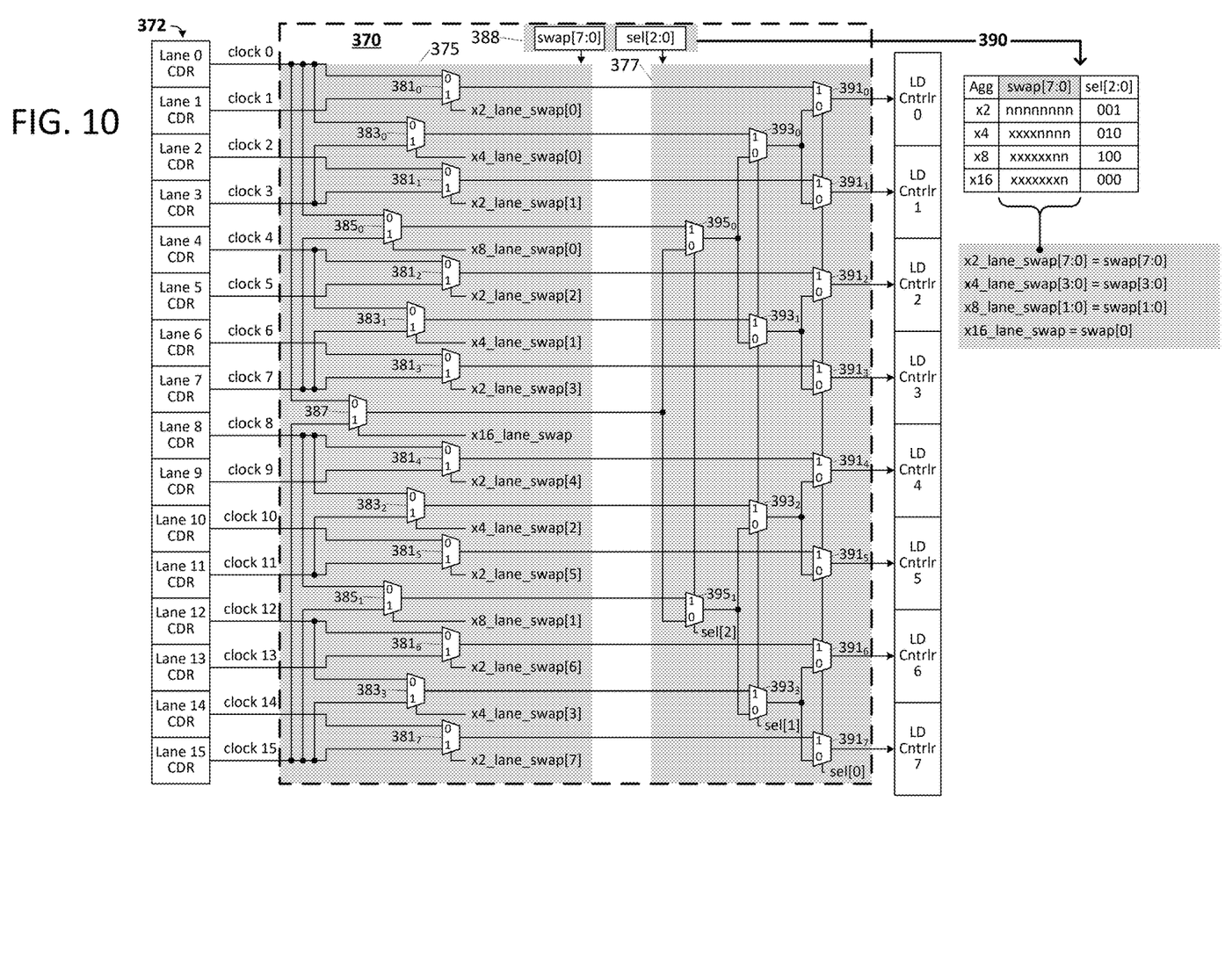
FIG. 10 illustrates an embodiment of a clock selection circuit that may be employed with the lane-dedicated controllers discussed in reference to FIGS. 1-9 to enable clock selection and forwarding in accordance with a pre-programmed link aggregation configuration and clock-swap selection.

FIG. 10 illustrates an embodiment of a clock selection circuit 370 that may be employed with the lane-dedicated controllers discussed above to enable clock selection and forwarding in accordance with a pre-programmed link aggregation configuration and lane-swap value. In the depicted 16 lane, 8 LD-controller example, clock-data recovery circuits 372 recover respective clock signals from the symbol streams of each incoming lane (i.e., "clock 0", "clock 1", ..., "clock 15"), forwarding those clock signals to a clock-swap circuit 375. Clock-swap circuit 375 selects, for each of four different aggregation settings (x2, x4, x8, x16) a clock from either the first lane or the last lane of the various aggregation sets, outputting the selected "link clocks" to a clock selection circuit 377. More specifically, in a x2 aggregation (i.e., eight x2 links), multiplexers $381_0$-$381_7$ within clock-swap circuit 375 select the clock recovered from either of two neighboring lanes (e.g., by CDR circuits for lanes 0 and 1 in the case of multiplexer $381_0$) in accordance with respective bits of a swap value ("swap [7:0]") programmed within configuration register 388. Similarly, in a x4 aggregation (four x4 links), multiplexers $383_0$-$383_3$ select the clock recovered from either of two outer lanes (e.g., lanes 0 and 3; lanes 4 and 7; lanes 8 and 11; lanes 12 and 15) in accordance with bits 0-3 of the swap value; in a x8 aggregation (two x8 links), multiplexers $385_0$ and $385_1$ select the clock recovered from either of two outer lanes (lanes 0 and 7; lanes 8 and 15) in accordance with bits 0 and 1 of the swap value; and in the x16 aggregation (single x16 link), multiplexer 387 selects the clock recovered from either of outer lanes 0 and 15 in accordance with bit 0 of the swap value.

Continuing with FIG. 10, multiplexers within clock selector 377 select, for each link implemented in accordance with the aggregation setting, a single clock from among the clocks output from clock-swap circuit 375, delivering that clock to all the LD controllers within the link (e.g., LD controllers 0-7). In the depicted example, a clock-selection field (sel[2:0]) within register 388 is set to one of four settings in accordance with the link aggregation configuration (e.g., either eight x2 links, four x4 links, two x8 links or one x16 link in the example shown at 390, though configuration into links of non-uniform lane count may be supported in alternative embodiments), such that respective bits of the selection field may be supplied to control inputs of clock-selection multiplexers $391_0$-$391_7$ (sel[0]), $393_0$-$393_3$ (sel[1]) and $395_0$-$395_1$ (sel[2]). If all the selection bits are low (x16 aggregation), the output of the x16 clock-swap multiplexer is supplied to all LD controllers, cascading through all three tiers of multiplexers 395, 393 and 391.

Still referring to FIG. 10, the inputs to the clock-swap multiplexers ($381_{0-7}$, $383_{0-3}$, $385_{0-1}$, 387) are routed in a balanced fashion that provides the same capacitive loading on the CDR clock outputs. Similarly, clock signals output from the clock-swap multiplexers are routed through the clock-selection multiplexers ($395_{0-1}$, $393_{0-3}$, $391_{0-7}$) in a binary tree topology that enables both balanced multiplexer placement and clock conductor routing-ensuring that the fanned-out instances of a selected clock arriving at inputs of respective LD controllers allocated to a given link aggregation or segment (i.e., one of eight x2 link segments, one of four x4 link segments, etc.) are aligned with nominally zero skew in any permissible aggregation or lane swap configuration.

Figure 11:
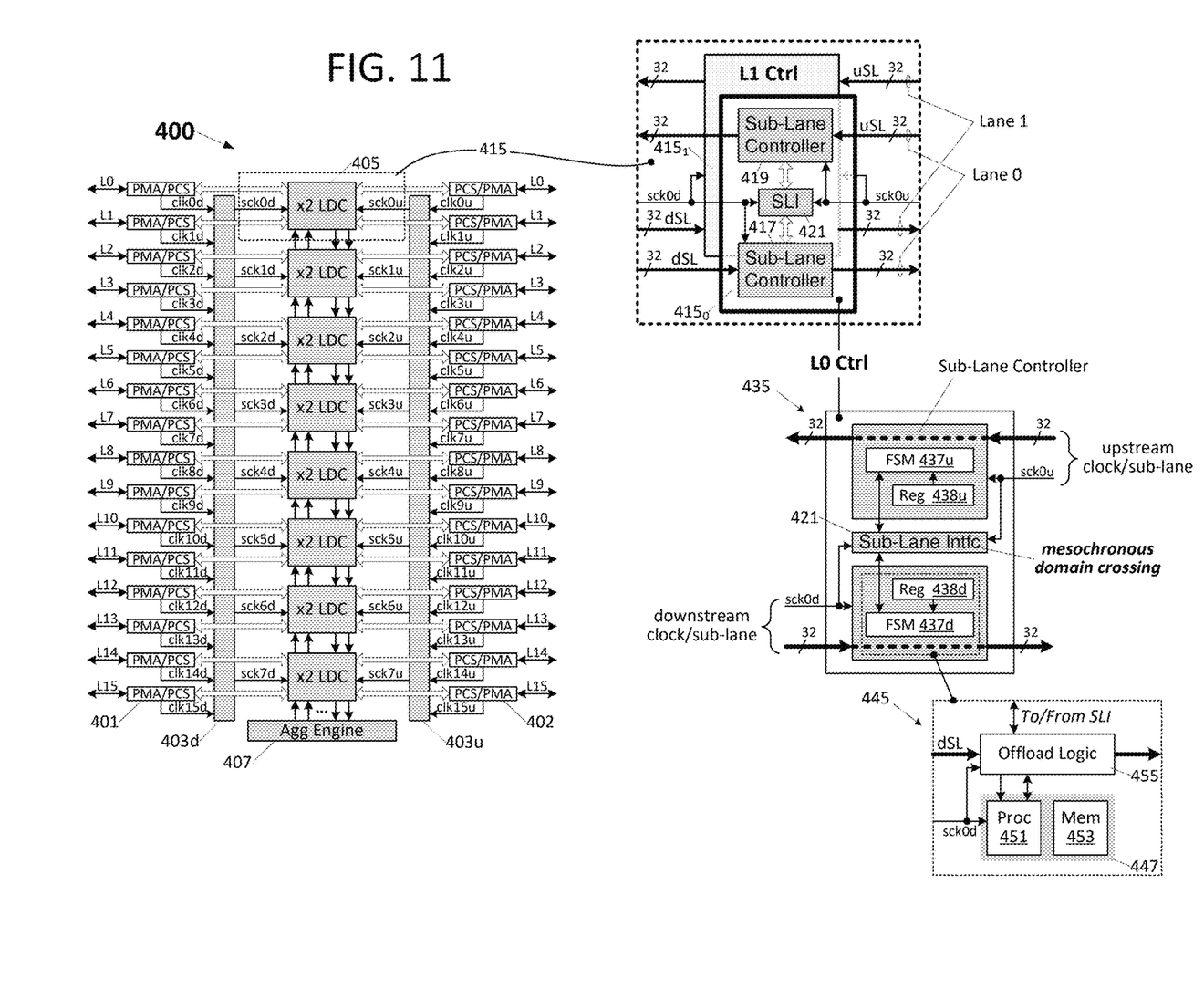
FIG. 11 illustrates a more detailed embodiment of the FIG. 2 retimer.

FIG. 11 illustrates a more detailed embodiment (400) of the FIG. 2 retimer, showing recovered-clock outputs (clk0-clk15) from PMA/PCS blocks 401/402 together with downstream and upstream clock selection circuits 403*d*, 403*u*, x2 lane-dedicated controllers 405 and aggregation engine 407, the controllers and aggregation engine coordinating via one or more busses (e.g., sync bus, interrupt bus, control/status bus, not specifically shown) generally as discussed above.

In one embodiment, each of the PMA/PCA blocks 401/402 includes clock-data recovery circuitry to generate a recovered clock from the incoming data stream (and thus clk0d-clk15d from signals propagating in the downstream direction and arriving via PMA/PCS blocks 401, and another set of clock signals, clk0u-clk15u, from signals propagating in the upstream direction and arriving via PMA/PCS blocks 402), and is otherwise implemented as discussed in reference to FIG. 2. Similarly, each of clock selection circuits 403*d* and 403*u* is implemented generally as discussed in reference to FIG. 10, receiving respective sets of clock signals (clk0d-clk15d, and clk0u-clk15u) and delivering selected clock signals (sck0d-sck7d and sck0u-sck7u, respectively, according to link aggregation configuration) to each of LD controllers 405 for signals propagating in the downstream and upstream directions.

Detail view 415 (still FIG. 11) illustrates an embodiment of a x2 Lane-Dedicated Controller (LDC) 405 having a separate controller per lane (4150, 4151), with each lane controller itself implemented by a respective pair of sub-lane controllers (or intra-lane "path") controllers 417, 419—one for each signal flow direction—and sub-lane interface circuit 421 (SLI). As shown, each of the sub-lane controllers 417, 419 receives and forwards data for a respective sub-lane (downstream sub-lane or path, dSL, and upstream sub-lane/path, uSL, respectively) as well as the selected clock (sck0d, sck0u) for that sub-lane. Thus, the downstream/upstream sub-lane controllers operate in clock domains established by respective clock signals (downstream clock, sck0d, and upstream clock, sck0u, in this example)—generally mesochronous (and possibly plesiochronous) clock domains having an arbitrary, time-varying (drifting) phase offset. Sub-lane interface 421 bridges the two clock domains (receiving both the downstream and upstream clocks) to enable information exchange (i.e., communication/coordination) between the sub-lane controllers, for example by buffering/queueing control-related data in response to the clock for the source sub-lane controller, and buffer-unloading/dequeuing of that data in response to the clock for the destination sub-lane controller.

Detail view 435 illustrates an embodiment of lane 0 controller 4150 having, as exemplary implementation of each of the sub-lane controllers 417/419, a respective finite state machine and configuration register (437*d*/437*u*, 438*d*/438*u*) with the finite state machine (FSM) for each sub-lane coupled to the sub-lane interface 421. In one embodiment, the FSMs and configuration registers (437*d*/437*u* and 438*d*/438*u*) function generally as described in FIG. 3 (with the lane controller also having an optional ID input as discussed above) to support programmable lane aggregation (into links of various widths) and interoperability with respect to other lane controllers. In alternative embodiments, the sub-lane controllers may have a shared state machine (or sequencer/processor or other type of control circuitry) and/or shared configuration register. In other embodiments, a shared state machine may perform sub-lane control functions for multiple same-direction sub-lanes—for example, serving as the controller for the downstream (or upstream) sub-lanes of both lanes coupled to a x2LDC (i.e., one sub-lane controller for the two upstream sub-lanes, another sub-lane controller for the two downstream sub-lanes). Also, as mentioned above (and discussed below), state machines 437*u*/437*d* may be implemented by any practicable control circuitry (e.g., sequencer, processor, microcontroller, etc.). In an example shown in detail view 445, for instance, the functions carried out by the control circuitry (e.g., state machine 437*d* and/or 437*u*) are implemented by a programmed processor 447 (e.g., microcontroller, general purpose processor, digital signal processor, etc. having a processing unit 451 and memory 453), with time-critical operations—e.g., those executed in real-time with respect to an advancing downstream/upstream data flow-carried out within offload logic 455 (i.e., function-dedicated circuitry).

In a number of embodiments, the sub-lane interface circuitry within a given xN LDC implements an independent unidirectional communication path between sub-lane controllers for each sub-lane pair—that is, two unidirectional communication paths per lane and thus, in the x2 LDC example, four unidirectional communication paths total. In the case of a consolidated sub-lane controller (i.e., one sub-lane controller handles same-direction sub-lanes for all lanes coupled to xN LDC), those unidirectional paths extend, via the SLI, between a single pair of sub-lane controllers. By contrast, in embodiments having a separate sub-lane controller per data flow direction per lane, two unidirectional communication paths (with opposite information flow directions) may extend between the sub-lane controllers for each lane.

Examples of information passed from one sub-lane controller to its counterpart over a given unidirectional (through-SLI) communication path may include, for example and without limitation:

- notification that an upstream or downstream link partner requests a new preset, together with the preset value itself and qualification information indicating (for example) whether the preset request violates (or alternatively complies with) specification requirements (e.g., PCIe specification requirements);
- notification that a link partner requests new equalization coefficients, together with the equalization coefficients themselves (e.g., pre, main, post) and qualification information indicating compliance/noncompliance with respect to specification requirements;
- notification that a link partner has transmitted a Control Skip Ordered Set (SKP OS), in which case the sub-lane controller may (for example) extract information from margin-type field of the SKP OS (e.g., bits [5:3] of symbols 6, 10, 14, 18 or 22 of the SKP OS, depending on SKP OS size);
- notification that the phy_mac_rxstatus signal from the Retimer PHY is asserted (e.g., to a logic '1' state); and/or
- notification an event intended to trigger reset of an electrical-idle-exit ordered set (EIEOS) interval counter (e.g., type-1 training sequence (TS1) with bit 2 of symbol 6 set).

The preset and equalization-coefficient examples (first two bullets above) may be implemented in accordance with a dynamic equalization procedure defined in the PCIe specification (e.g., for Generation 3 and above). The high-frequency component of PCIe signals are negatively affected during transit through a band-limited PCIe channel, a signal distortion that may yield bit errors at the receiver link partner. In a number of embodiments, equalization is effected (in PCIe-compliant systems and systems according to other standardized or proprietary interconnect specifications) via an adaptive filter with coefficients that are iteratively updated according to time-varying behavior of the physical channel. Equalization may be implemented at the signal transmitter and/or signal receiver (opposite ends of a signaling lane or sub-lane), but is often more effective at the transmitter (prior to noise injection from the channel).

In a number of embodiments, transmit-side equalization is implemented (e.g., at a sub-lane transmitter) by a 3-tap finite-impulse-response (FIR) filter with coefficients for "pre", "main" and "post" cursors (i.e., coefficient for next-to-be transmitted symbol, coefficient for symbol being transmitted, and coefficient for most recently transmitted symbol, respectively). The sub-lane transmitter may either use default values of these coefficients (e.g., from a programmable configuration register within the retimer) or it may use values communicated to it by the receive-side link partner (e.g., in PCIe-compliant systems, values obtained from TS1/TS2 ordered sets during the link training phase of the link bring-up). Some interconnect standards (including PCIe) encode predefined sets of equalization coefficients into "preset" values—that is a given preset value corresponds to (implicitly represents) predefined set of equalization coefficients, thus enabling specification of multiple coefficients through transmission of a relatively low-overhead preset value.

Some interconnect standards (including PCIe) specify an adaptive equalization-coefficient determination to be carried out independently for each of the lanes of a given link and each sub-lane (direction) of a given lane. The PCIe specification, for example, describes a training sequence (to be carried out for each sub-lane within a link) for adaptively converging to optimal transmit-equalization coefficients (i.e., nominally optimal for a given channel behavior). In the FIG. 11 embodiment, a link partner compares data received from the retimer (i.e., data transmitted via the PMA for a given sub-lane) against expected data (e.g., one or more values predefined according to PCIe or other standards specification or otherwise known in advance) to iteratively revise equalization coefficients to be applied by the retimer (e.g., seeking to minimize bit error rate or minimize/maximize any other signal-integrity metric), communicating those coefficients (in some cases represented by presets) to the retimer (e.g., via TS1/TS2 ordered sets in a PCIe-compliant implementation) in association with a request/instruction for application thereof within the sub-lane transmitter.

Presets and/or explicit equalization coefficients (i.e., received within the retimer via a given sub-lane) are communicated between counterpart sub-lane controllers whenever the link partner (upstream or downstream) issues a request for the retimer component to apply new (or update) equalization coefficients. In the FIG. 11 embodiment, for example, presets/coefficients received via an in-bound sub-lane (i.e., from a link partner) are forwarded/communicated from the controller for that sub-lane (417 or 419) to the counterpart sub-lane controller (for the same lane) via sub-lane interface 421 together with the request for the recipient sub-lane controller to apply the new/updated equalization coefficients within its transmitter (equalizing the transmission back to the link partner that supplied the preset/equalization coefficients). As any error in the inter-controller communication may result in significant disruption or even link failure (e.g., as may occur if communication error within sub-lane interface 421 results in installation of unintended equalization coefficients), the communication via sub-lane interface 421 needs to occur without error or loss of information. In the FIG. 11 embodiment in which source and destination sub-lane controllers operate in different clock domains, communication of presets/equalization coefficients and corresponding requests to apply those values propagates through the sub-lane interface to bridge the source- and destination-controller clock domains, entering the sub-lane interface in response to transitions of the source-controller clock and exiting the sub-lane interface in response to transitions of the destination-controller clock. This lossless domain crossing is implemented with respect to preset/equalization (both the values and the request to apply those values) as well other events/values communicated between the two sub-lane controllers.

Referring to FIGS. 1-11 generally, one or more programmed microcontrollers and/or dedicated hardware circuits (e.g., finite state machines, registered or combinational circuits, etc.) may be provided to implement and/or control all or part of the various architectural and functional elements within the dedicated-lane controller architectures presented herein (e.g., to implement any one or more of the lane-dedicated controllers, aggregation engine, and/or circuitry within the host integrated circuit component that interacts with the controllers or aggregation engine. Additionally, any or all of those architectural/functional elements (including the entirety of a dedicated-lane component architecture, such as a retimer architecture, endpoint architecture or root complex architecture) may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details not required to practice those embodiments. For example, the various signaling rates and related frequencies, lane counts, path widths, block sizes, encoding/decoding schemes, clock frequencies, aggregation/segmentation options, numbers of selectable/swap-able clocks or clock phases, and so forth are provided for purposes of example only-higher/lower/alternative rates, frequencies, numbers of phases, frequency divisors/multipliers, aggregation settings (including single-lane aggregation and non-uniform lane counter per link, lane counts, block sizes, encoding schemes etc. may be implemented in all cases. Similarly, signaling link parameters, protocols, configurations may be implemented in accordance with any practicable open or proprietary standard (PCIe being but one example) and any version of such standard. Links or other interconnection between integrated circuit devices or internal circuit elements or blocks may be shown as buses or as single signal lines. Each of the buses can alternatively be a single signal line (e.g., with digital or analog signals time-multiplexed thereon), and each of the single signal lines can alternatively be a bus. Signals and signaling links, however shown or described, can be single-ended or differential. Logic signals shown as having active-high assertion or "true" states, may have opposite assertion states in alternative implementations. A signal driving circuit is said to "output" a signal to a signal receiving circuit when the signal driving circuit asserts (or de-asserts, if explicitly stated or indicated by context) the signal on a signal line coupled between the signal driving and signal receiving circuits. The term "coupled" is used herein to express a direct connection as well as a connection through one or more intervening circuits or structures. Integrated circuit device or register "programming" can include, for example and without limitation, loading a control value into a configuration register or other storage circuit within the integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operational aspect of the device. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. An integrated circuit component comprising:
   a first signaling interface to be coupled to a plurality of signaling lanes;
   lane controllers dedicated to controlling communication via respective subsets of the signaling lanes, each of the lane controllers having:
      circuitry to monitor a respective stream of information received via the respective subset of the signaling lanes for predetermined control information,
      output circuitry to transmit an event-detect signal in response to detecting the predetermined control information, and
      input circuitry to receive event-detect signals transmitted by the output circuitry of each of the others of the lane controllers; and
   a synchronization bus that interconnects the output circuitry of each of the lane controllers to the input circuitry of each of the others of the lane controllers such that an event-detect signal transmitted by the output circuitry within any one of the lane controllers is received via the respective input circuitry within each of the others of the lane controllers.

2. The integrated circuit component of claim 1 wherein each of the lane controllers further comprises circuitry to detect assertion of a first control signal, and wherein the circuitry within each of the lane controllers to monitor the respective stream of information comprises circuitry to commence monitoring the respective stream of information in response to assertion of the first control signal such that all lane controllers concurrently monitor the respective streams of information.

3. The integrated circuit component of claim 1 wherein the respective streams of information received via the respective subsets of signaling lanes comprises respective streams of symbols organized in blocks, and wherein the predetermined control information comprises a block of symbols identifiable, by each of the lane controllers, as a temporal marker.

4. The integrated circuit component of claim 3 wherein the respective streams of symbols are protocol-compliant with a Peripheral Component Interconnect Express (PCIe)

specification, and wherein the block of symbols identifiable, by each of the lane controllers, as a temporal marker comprises a PCIe skip ordered set (SKPOS).

5. The integrated circuit component of claim 1 further comprising a second signaling interface to which the lane controllers forward the respective streams of information for output from the integrated circuit component.

6. The integrated circuit component of claim 5 further comprising alignment circuitry within each of the lane controllers and that, for each one of the lane controllers for which the predetermined control information is detected prior to receiving respective event-detect signals from all others of the lane controllers, ceases forwarding the respective stream of information to the second interface throughout a respective alignment time interval that commences at detection of the predetermined control information within the one of the lane controllers and concludes after respective event-detect signals have been received from all others of the lane controllers.

7. The integrated circuit component of claim 6 wherein the alignment circuitry comprises circuitry that, for each one of the lane controllers for which the predetermined control information is detected prior to receiving respective event-detect signals from all others of the lane controllers, reverts to forwarding the respective stream of information to the second interface at conclusion of the respective alignment time interval.

8. The integrated circuit component of claim 7 wherein the alignment circuitry within the lane controller for the respective stream of information within which the predetermined control information is detected later in time than for all others of the respective streams of information comprises circuitry to forward that stream of information to the second interface without cessation following detection of the predetermined control information therein.

9. The integrated circuit component of claim 8 wherein the alignment circuitry comprises circuitry that, for each one of the lane controllers for which the predetermined control information is detected prior to receiving respective event-detect signals from all others of the lane controllers, reverts to forwarding the respective stream of information to the second interface in response to receiving the event-detect signal output from the lane controller dedicated to controlling communication via the respective subset of the signaling lanes conveying the stream of information within which the predetermined control information is detected later in time than for all others of the respective streams of information.

10. The integrated circuit component of claim 5 further comprising configuration circuitry to store information that defines two or more subsets of the lane controllers, and wherein each one of the lane controllers for which the predetermined control information is detected prior to receiving respective event-detect signals from all others of the lane controllers within the same subset of the lane controllers, ceases forwarding the respective stream of information to the second interface throughout a respective alignment time interval that commences at detection of the predetermined control information within the one of the lane controllers and concludes after respective event-detect signals have been received from all others of the lane controllers within the same subset of the lane controllers.

11. The integrated circuit component of claim 1 wherein the lane controllers comprise respective registers to store respective link aggregation values that indicate one or more quantities of the subsets of the signaling lanes aggregated to form a signaling link for which communication is controlled by either (i) all the lane controllers or (ii) a subset of the lane controllers, fewer than all.

12. A method of operation within an integrated circuit component having a first signaling interface coupled to a plurality of signaling lanes, lane controllers dedicated to controlling communication via respective subsets of the signaling lanes, and a synchronization bus that couples each of the lane controllers to each of the others of the lane controllers, the method comprising:
concurrently monitoring, within all the lane controllers, respective streams of information received via the respective subsets of the signaling lanes for predetermined control information;
outputting, from each of the lane controllers via the synchronization bus, a respective event-detect signal in response to detecting the predetermined control information within the stream of information received via the respective subset of the signaling lanes;
receiving, within each of the lane controllers via the synchronization bus, respective event-detect signals output by all others of the lane controllers.

13. The method of claim 12 further comprising detecting, within each of the lane controllers, assertion of a first control signal, and wherein concurrently monitoring, within all the lane controllers, the information propagating via the respective subsets of signaling lanes comprises commencing, within each of the lane controllers, monitoring information propagating via the respective subset of signaling lanes in response to assertion of the first control signal.

14. The method of claim 12 wherein the respective streams of information received via the respective subsets of signaling lanes comprises respective streams of symbols organized in blocks, and wherein the predetermined control information comprises a block of symbols identifiable, by each of the lane controllers, as a temporal marker.

15. The method of claim 14 wherein the respective streams of symbols are protocol-compliant with a Peripheral Component Interconnect Express (PCIe) specification, and wherein the block of symbols identifiable, by each of the lane controllers, as a temporal marker comprises a PCIe skip ordered set (SKPOS).

16. The method of claim 12 further comprising forwarding the respective streams of information from the lane controllers to a second signaling interface for output from the integrated circuit component.

17. The method of claim 16 further comprising, within each one of the lane controllers for which the predetermined control information is detected prior to receiving respective event-detect signals from all others of the lane controllers, ceasing forwarding the respective stream of information to the second interface throughout a respective alignment time interval that commences at detection of the predetermined control information within the one of the lane controllers and concludes after respective event-detect signals have been received from all others of the lane controllers.

18. The method of claim 17 further comprising, within each one of the lane controllers for which the predetermined control information is detected prior to receiving respective event-detect signals from all others of the lane controllers, reverting to forwarding the respective stream of information to the second interface at conclusion of the respective alignment time interval.

19. The method of claim 18 further comprising forwarding to the second interface without cessation the respective stream of information within which the predetermined control information is detected later in time than for all others of the respective streams of information.

20. The method of claim 19 wherein each one of the lane controllers for which the predetermined control information is detected prior to receiving respective event-detect signals from all others of the lane controllers reverts to forwarding the respective stream of information to the second interface in response to receiving the event-detect signal output from the lane controller dedicated to controlling communication via the respective subset of the signaling lanes conveying the stream of information within which the predetermined control information is detected later in time than for all others of the respective streams of information.

21. The method of claim 16 further comprising storing information that defines two or more subsets of the lane controllers, and wherein each one of the lane controllers for which the predetermined control information is detected prior to receiving respective event-detect signals from all others of the lane controllers within the same subset of the lane controllers, ceases forwarding the respective stream of information to the second interface throughout a respective alignment time interval that commences at detection of the predetermined control information within the one of the lane controllers and concludes after respective event-detect signals have been received from all others of the lane controllers within the same subset of the lane controllers.

22. The method of claim 12 further comprising storing, within registers corresponding respectively to the lane controllers, respective link aggregation values that indicate one or more quantities of the subsets of the signaling lanes aggregated to form a signaling link for which communication is controlled by either (i) all the lane controllers or (ii) a subset of the lane controllers, fewer than all.

23. An integrated circuit component comprising:
a first signaling interface to be coupled to a plurality of signaling lanes;
lane controllers dedicated to controlling communication via respective subsets of the signaling lanes, each of the lane controllers having:
  means for monitoring a respective stream of information received via the respective subset of the signaling lanes for predetermined control information
  means for transmitting an event-detect signal in response to detecting the predetermined control information, and
  means for receiving event-detect signals transmitted by the means for transmitting within each of the others of the lane controllers; and
means for interconnecting the means for transmitting within each of the lane controllers to the means for receiving within each of the others of the lane controllers such that an event-detect signal transmitted by the means for transmitting within any one of the lane controllers is received via the respective means for receiving within each of the others of the lane controllers.

* * * * *